(12) United States Patent
Tomita

(10) Patent No.: US 8,289,557 B2
(45) Date of Patent: Oct. 16, 2012

(54) PULL PRINTING SYSTEM, SERVER MACHINE, AND METHOD FOR MANAGING PRINT JOB

(75) Inventor: Kouichi Tomita, Osaka (JP)

(73) Assignee: Konica Minolta Business Technologies, Ltd., Chiyoda-Ku, Tokyo (JP)

( * ) Notice: Subject to any disclaimer, the term of this patent is extended or adjusted under 35 U.S.C. 154(b) by 56 days.

(21) Appl. No.: 13/039,624

(22) Filed: Mar. 3, 2011

(65) Prior Publication Data

US 2011/0222116 A1    Sep. 15, 2011

(30) Foreign Application Priority Data

Mar. 12, 2010    (JP) ................................. 2010-056606

(51) Int. Cl.
*G06F 3/12* (2006.01)
(52) U.S. Cl. ...................... 358/1.15; 358/1.14; 358/1.16
(58) Field of Classification Search ................. 358/1.14, 358/1.15, 1.16
See application file for complete search history.

(56) References Cited

U.S. PATENT DOCUMENTS

| | | | |
|---|---|---|---|
| 6,791,703 B1 * | 9/2004 | Maeda et al. ................. | 358/1.15 |
| 7,460,265 B2 * | 12/2008 | Keeney et al. ............... | 358/1.15 |
| 2009/0284785 A1 | 11/2009 | Bando | |
| 2011/0176163 A1 * | 7/2011 | Towata ......................... | 358/1.15 |

FOREIGN PATENT DOCUMENTS

| | | |
|---|---|---|
| JP | 2006-099714 A | 4/2006 |
| JP | 2009-274242 A | 11/2009 |

OTHER PUBLICATIONS

Decision to Grant a Patent issued Dec. 27, 2011 in corresponding Japanese Patent Application No. 2010-056606, together with an English translation thereof.

* cited by examiner

*Primary Examiner* — King Poon
*Assistant Examiner* — Lawrence Wills
(74) *Attorney, Agent, or Firm* — Buchanan Ingersoll & Rooney PC

(57) ABSTRACT

An image forming apparatus includes a request portion that requests, from a server machine, access information used for reading out a job, and an access information reception portion that receives the access information. The server machine includes a job reception portion that receives the job and stores the job into a first area, a second area into which the job is to be stored for the image forming apparatus, a storage portion that stores, therein, second read-out information used for reading out the job from the second area, and a response portion that receives a request, and if there is first read-out information used for reading out the job from the first area, then sends the first read-out information to the image forming apparatus as the access information, and otherwise, moves the job to the second area, and sends the second read-out information to the image forming apparatus.

16 Claims, 13 Drawing Sheets

| USER ID | PASSWORD | FUNCTION | | ... | ... |
| --- | --- | --- | --- | --- | --- |
| | | PRINT | FAX | ... | |
| User01 | Pass01 | YES | YES | ... | ... |
| User02 | Pass02 | YES | NO | ... | ... |
| User03 | Pass03 | YES | YES | ... | ... |
| ⋮ | ⋮ | ⋮ | ⋮ | ⋮ | ⋮ |
| User32 | Pass32 | YES | NO | ... | ... |
| User33 | Pass33 | YES | YES | ... | ... |
| ⋮ | ⋮ | ⋮ | ⋮ | ⋮ | ⋮ |

2711 — USER ID column
2712 — PASSWORD column
2713 — FUNCTION column

| 3611 USER ID | 3612 PASSWORD | 3613 ACCOUNT | 3614 FOLDER PATH | 3615 VIRTUAL DIRECTORY | ... |
|---|---|---|---|---|---|
| User01 | Pass01 | - | C:¥usr01/job | - | ... |
| User02 | Pass02 | - | - | - | ... |
| User03 | Pass03 | Ausr03 | C:¥usr03/job | /U03 | ... |
| ... | ... | ... | ... | ... | ... |
| User32 | Pass32 | Ausr32 | C:¥usr32/job | /U32 | ... |
| User33 | Pass33 | - | - | - | ... |
| ... | ... | ... | ... | ... | ... |

| MFP ID | PASSWORD | ACCOUNT | FOLDER PATH | VIRTUAL DIRECTORY | |
|---|---|---|---|---|---|
| MFP01 | MPass01 | Amfp01 | C:¥mfp01/job | /M01 | ... |
| MFP02 | MPass02 | Amfp02 | C:¥mfp02/job | /M02 | ... |
| MFP03 | MPass03 | Amfp03 | C:¥mfp03/job | /M03 | ... |

3621  3622  3623  3624  3625

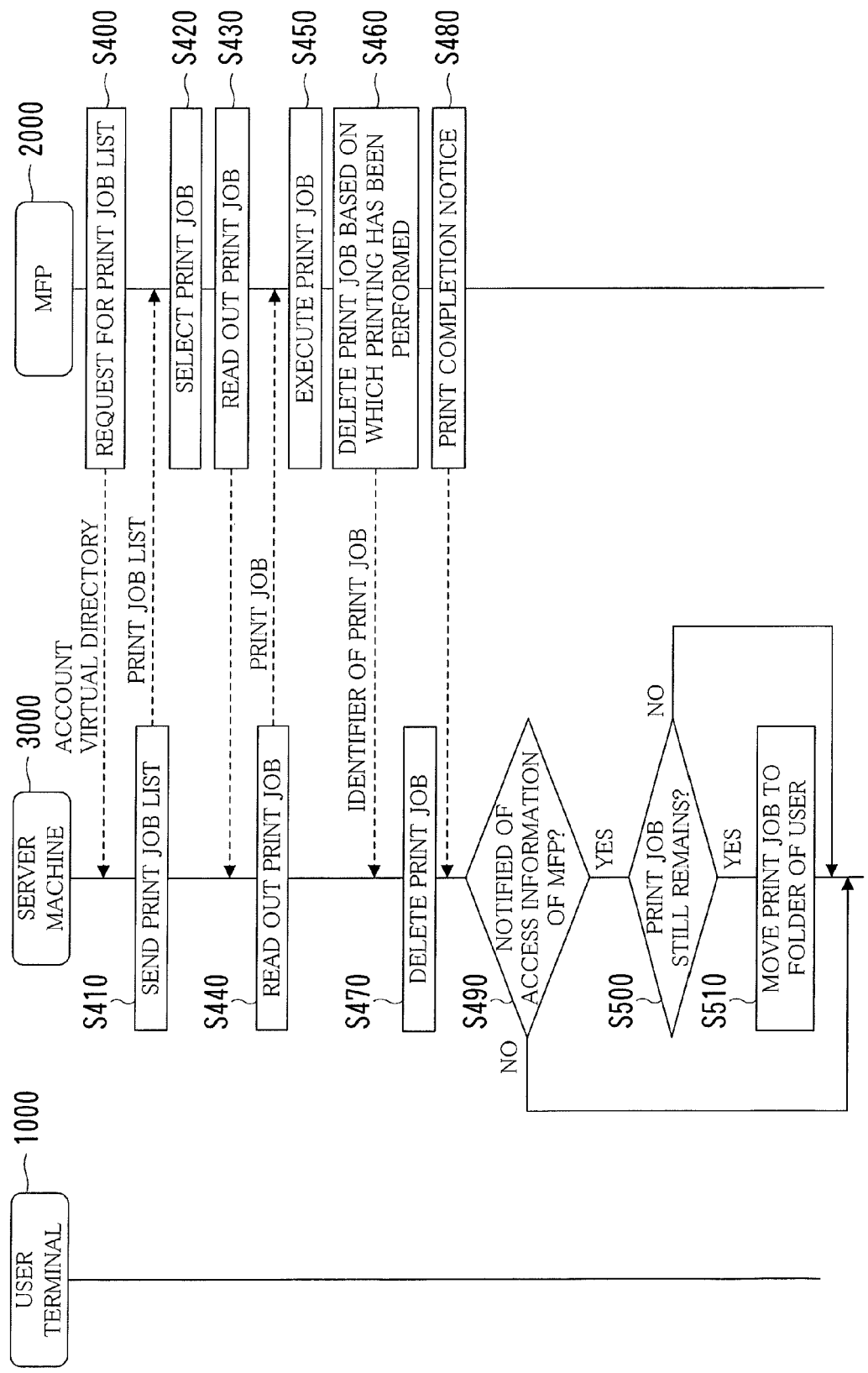

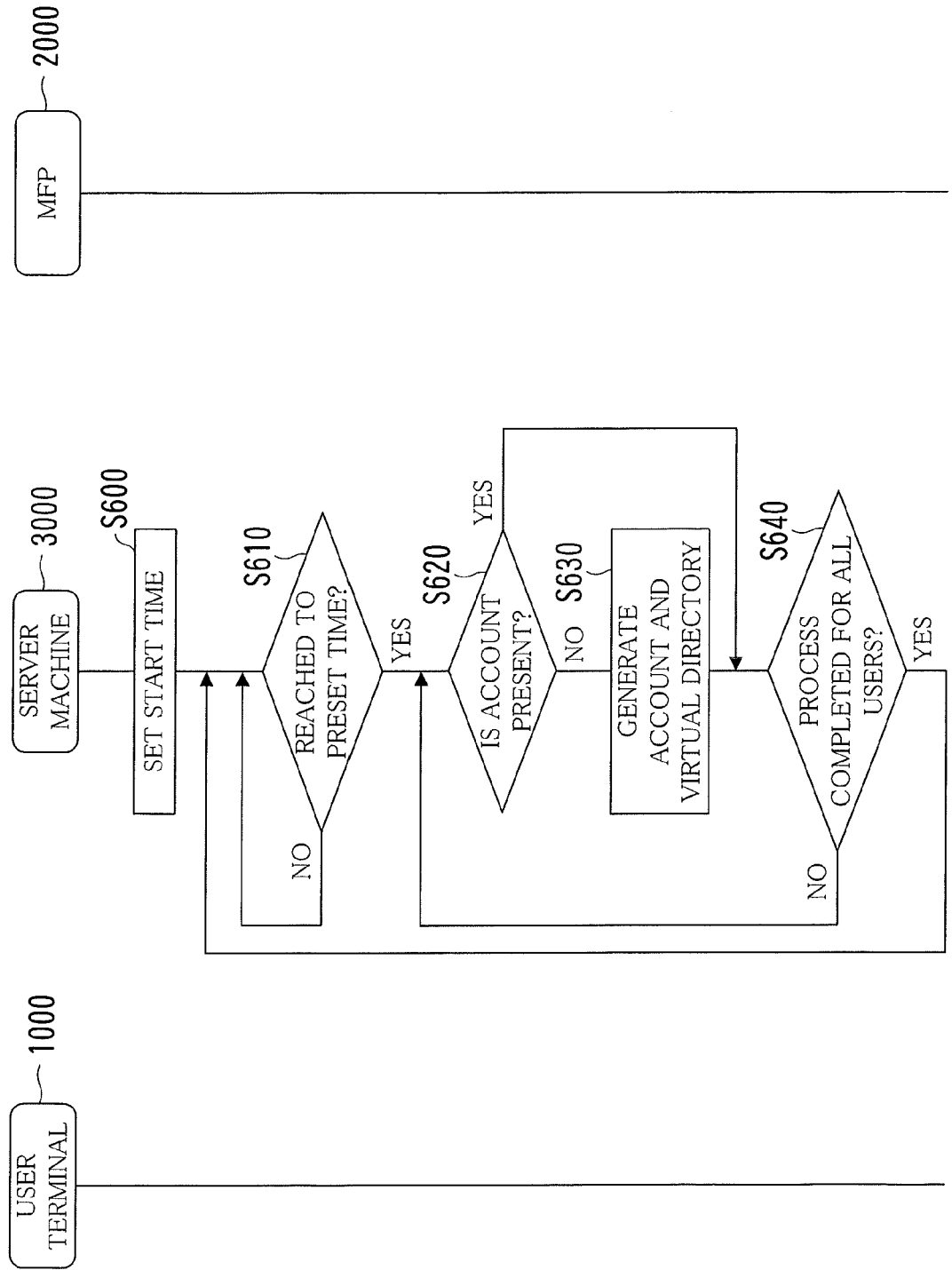

PULL PRINTING SYSTEM, SERVER MACHINE, AND METHOD FOR MANAGING PRINT JOB

This application is based on Japanese patent application No. 2010-056606 filed on Mar. 12, 2010, the contents of which are hereby incorporated by reference.

BACKGROUND OF THE INVENTION

1. Field of the Invention

The present invention relates to a pull printing system using an image forming apparatus.

2. Description of the Related Art

In recent years, in order to print a document or the like produced by using a user terminal such as a personal computer, a printing method has been employed in which a print job is temporarily stored in a server machine instead of being sent directly to a Multi Function Peripheral (MFP) that prints the document.

In the case where, for example, a plurality of users share a plurality of MFP's, and the individual users send print jobs for documents or the like from their own terminals, the print jobs sent by all the users are temporarily accumulated in a server machine.

Each of the users goes to the installation site of the MFP to be used for printing, and operates an operational panel or the like to instruct the MFP to perform printing, and thereby, the MFP prints a document or the like. This is called pull printing.

According to the pull printing, a user can obtain a printed matter instantly because he/she selects an available MFP from among the plurality of MFP's to cause the selected MFP to perform printing. Further, the pull printing ensures the security of a printed matter because the printed matter is less likely to be left unattended and be carried away by somebody else.

Since a server machine is shared by a plurality of users in the pull printing, the following problems may occur. In particular, when many print jobs are sent to the server machine all at once, a load imposed on the server machine is increased, so that the server machine is less responsive. In the worst case, the server machine may go down.

To cope with this, a technique has been proposed in which a plurality of servers are used to distribute loads imposed thereon (see Japanese Laid-open Patent Publication No. 2006-099714).

However, a load imposed on a server machine is hardly beyond the capability thereof during the operation. This is because a server machine is generally used which has the capability to sufficiently withstand a load imposed thereon during the operation.

Stated differently, a situation under which a load on a server machine is increased is limited. In particular, a server machine is probably overloaded at the time when the operation of a system is started. This is because almost all of the users may send print jobs at the same time.

If a load imposed on the server machine can be reduced at the time of the start of operation, few problems arise for operation.

SUMMARY

The present disclosure is directed to solve the problems pointed out above, and therefore, an object of an embodiment of the present invention is to reduce a load imposed on a server machine at the time when the operation of a pull printing system is started.

According to an aspect of the present invention, a pull printing system includes a server machine, and an image forming apparatus. The image forming apparatus includes a request portion that requests, from the server machine, access information used for reading out a print job, and a reception portion that receives the access information from the server machine. The server machine includes a print job storage portion that receives a print job and stores the print job thus received into a job storage area, a for-device storage area into which a print job is stored and which is provided for the image forming apparatus, a storage portion that stores, therein, access information used for reading out the print job stored in the for-device storage area, and a response portion that, if a request is received from the request portion of the image forming apparatus, and if there is access information used for reading out the print job stored in the job storage area, sends said access information to the image forming apparatus, and, if a request is received from the request portion of the image forming apparatus, and if there is no access information used for reading out the print job stored in the job storage area, moves the print job stored in the job storage area to the for-device storage area, and sends, to the image forming apparatus, the access information used for reading out the print job stored in the for-device storage area.

These and other characteristics and objects of the present invention will become more apparent by the following descriptions of preferred embodiments with reference to drawings.

BRIEF DESCRIPTION OF THE DRAWINGS

FIG. 5 is a diagram illustrating an example of the structure and details of log-on data.

FIG. 6A is a diagram illustrating an example of the structure and details of user management data, and FIG. 6B is a diagram illustrating an example of the structure and details of MFP management data.

FIG. 11 is a flowchart depicting an example of a print job execution process.

FIG. 12 is a flowchart depicting an example of an access information generating process.

DESCRIPTION OF THE PREFERRED EMBODIMENTS

Embodiment

[Outline]

In general, prior to the start of operation of a pull printing system using a Web server, registration necessary for performing communication between a server machine and MFP's as well as user terminals included in the pull printing system is performed, and registration of users who are permitted to use the MFP's is performed on the MFP's.

After the operation of the pull printing system is started, a user operates his/her user terminal to transmit the first print job to the server machine. The server machine receives the print job. If the print job is the first print job from that user, then the server machine creates a folder for the user into which print jobs are to be accumulated and stores the received print job into the folder.

When receiving a request for a print job from an MFP, the server machine informs the MFP of access information used for accessing a folder into which the print job is stored. The MFP uses the access information informed by the server machine to read out the print job, and performs printing.

At the time when the operation of the pull printing system is started, many users send print jobs all at once. Since all the print jobs are sent from the users who have never used the pull printing system before, the server machine generates folders for the individual users. Generating, all at once, access information for all of the generated user folders puts a heavy load on the server machine. In particular, redundant registration of account information is not permitted because the account information is information serving as the basis of the security of the server machine. The server machine is overloaded with generation of many pieces of account information at one time.

In view of this, a pull printing system 100 according to the present invention is configured to reduce such a load imposed on the server machine at the time of the start of operation of the pull printing system 100.

It is conceivable that folders for all users of the pull printing system and access information for the folders are generated in the server machine before starting the operation. However, generating, beforehand, folders and account information for all users wastes resources of the server machine, unless the environment is such that all users authorized to use the server machine always use the server machine. This leads to the increase in a load imposed on a system administrator, which is inappropriate.

Descriptions are given below of the pull printing system 100 according to an embodiment of the present invention, with reference to drawings.

[Functions]

Figure 1:
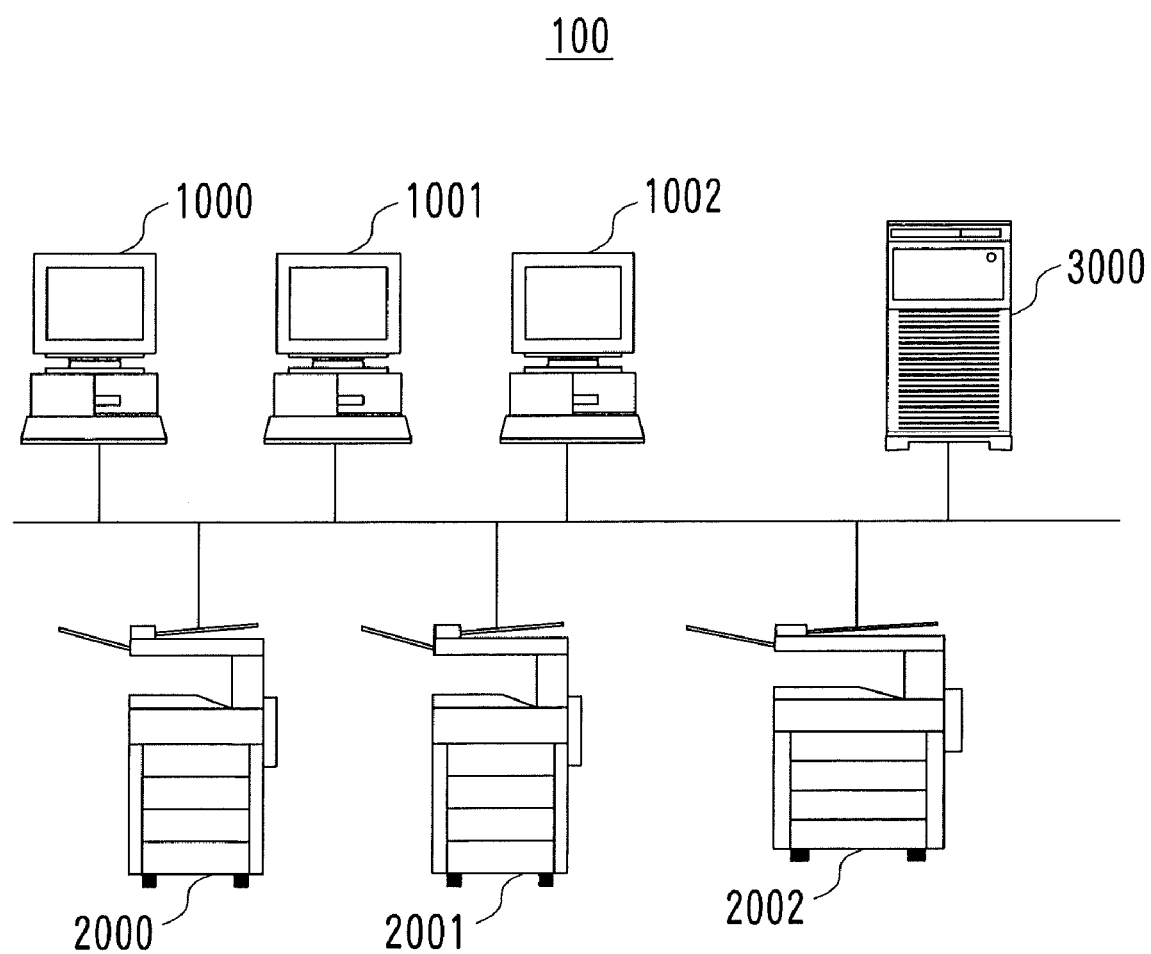
FIG. 1 is a diagram illustrating an example of the overall configuration of a pull printing system.

FIG. 1 is a diagram illustrating an example of the overall configuration of the pull printing system 100.

The pull printing system 100 is configured of a user terminal 1000, a user terminal 1001, a user terminal 1002, an MFP 2000, an MFP 2001, an MFP 2002, and a server machine 3000. In the illustrated example, the pull printing system 100 includes the three user terminals and the three MFP's; however, the number thereof is not limited thereto as long as at least one user terminal and at least one MFP are provided in the pull printing system 100. In addition, although only one server machine is exemplified, a plurality of server machines may be included in the pull printing system 100.

Each of the user terminal 1000, the user terminal 1001, and the user terminal 1002 is a terminal such as a personal computer, and is provided with an interface, e.g., a display and a keyboard. Each of the user terminal 1000, the user terminal 1001, and the user terminal 1002 transmits a print job to the server machine 3000.

Each of the MFP 2000, the MFP 2001, and the MFP 2002 is generally called a multifunction device, and is configured to integrate, thereinto, a variety of functions, such as copying, faxing, network printing, scanning, and a box function. Upon receiving a print command from a user, each of the MFP 2000, the MFP 2001, and the MFP 2002 obtains a print job from the server machine 3000 and performs printing based on the print job.

The server machine 3000 is a file server having a function to store print jobs sent from the user terminal 1000 and the like. The server machine 3000 informs the MFP 2000 and the like of access information that is necessary for the MFP 2000 and the like to obtain predetermined print jobs stored in the subject server machine 3000.

Descriptions are provided below of the hardware configuration of the MFP 2000.

Figure 2:
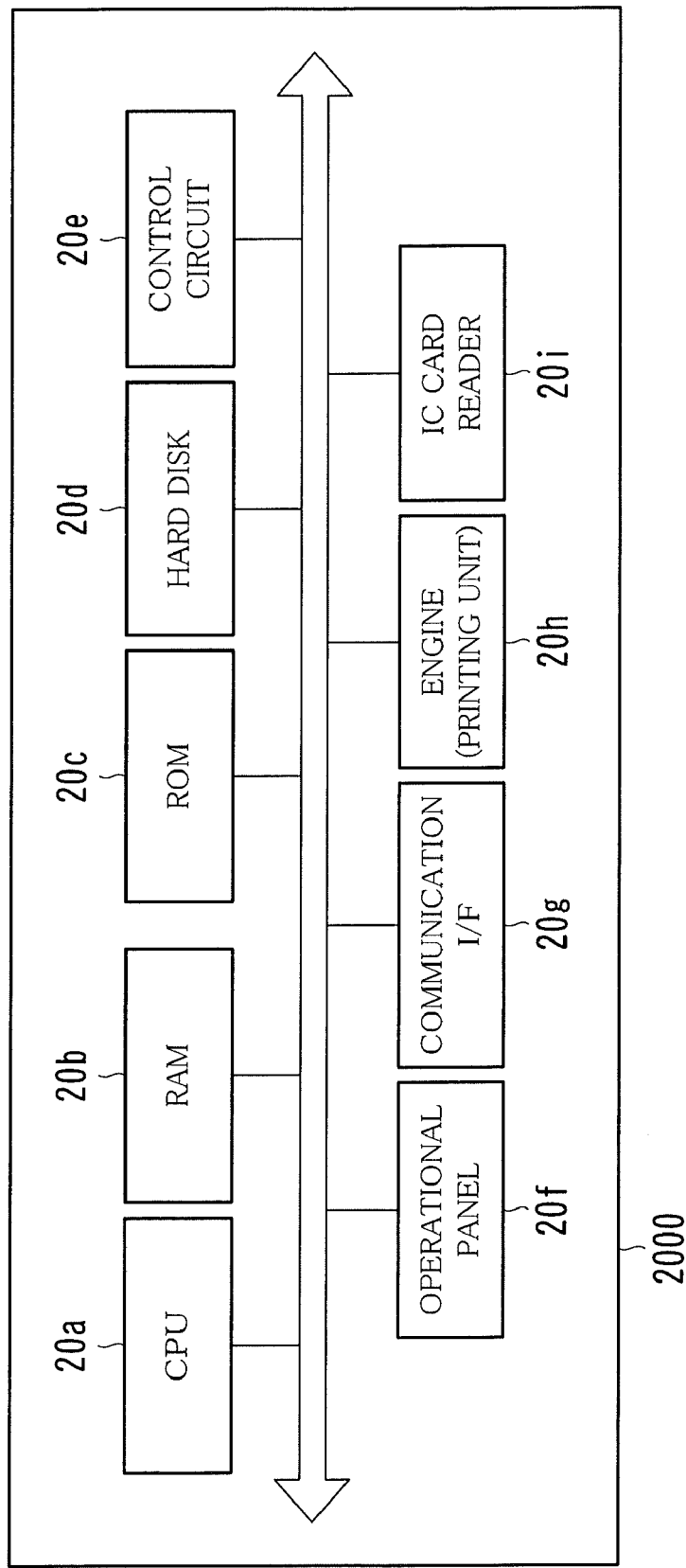
FIG. 2 is a diagram illustrating an example of the hardware configuration of an MFP.

FIG. 2 is a diagram illustrating an example of the hardware configuration of the MFP 2000. The MFP 2001 and the MFP 2002 have the same configuration as the MFP 2000.

The MFP 2000 is configured of a Central Processing Unit (CPU) 20a, a Random Access Memory (RAM) 20b, a Read-Only Memory (ROM) 20c, a hard disk 20d, a control circuit 20e, an operational panel 20f, a communication interface 20g, a printing unit 20h, an IC card reader 20i, and so on.

The control circuit 20e is a circuit for controlling the hard disk 20d, the operational panel 20f, the communication interface 20g, the printing unit 20h, the IC card reader 20i, and so on.

The operational panel 20f is a touch-screen display panel that displays, for example, a screen for giving a message or instructions to a user, a screen for the user to enter a desired process type and desired process conditions, and a screen for displaying the result of a process executed by the CPU 20a. The user can give instructions, specify process conditions, or enter a password to the MFP 2000 by touching a predetermined position of the operational panel 20f. Thus, the operational panel 20f acts as a user interface for the user who operates the MFP 2000.

The communication interface 20g is a Network Interface Card (NIC) for communicating with another device such as the server machine 3000 according to Transmission Control Protocol/Internet Protocol (TCP/IP) via a communication line, or a modem.

The printing unit 20h serves to print, onto paper, an image reproduced based on print data of a print job obtained from the server machine 3000.

The IC card reader 20i is an IC card reading device for reading out data such as a user ID from an IC card.

Descriptions are provided below, with reference to FIG. 3, of the user terminal 1000, the MFP 2000, and the server machine 3000, all of which constitute the pull printing system 100.

Figure 3:
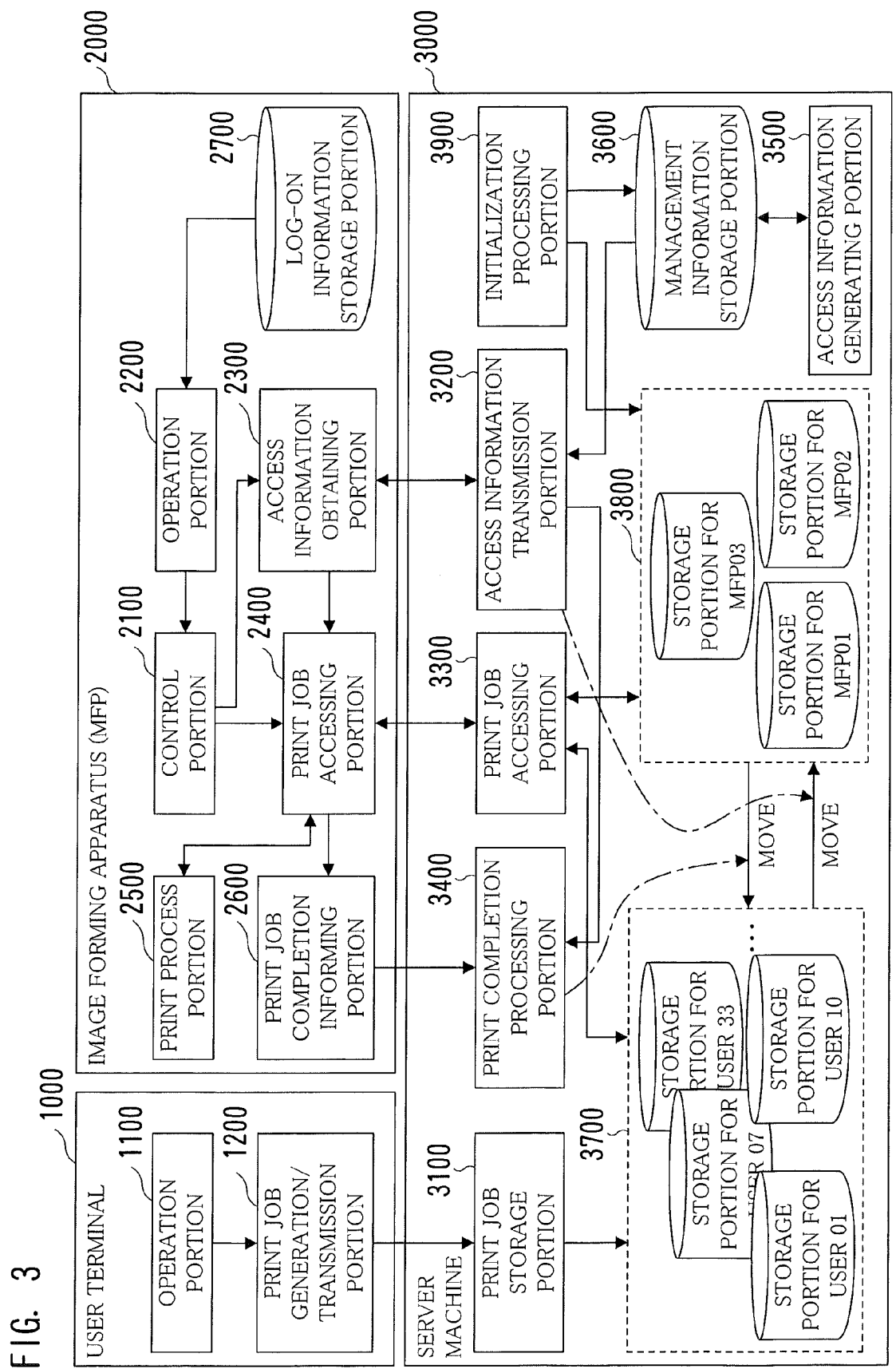
FIG. 3 is a block diagram illustrating an example of the functional configuration of a user terminal, an MFP, and a server machine.

FIG. 3 is a block diagram illustrating an example of the functional configuration of the user terminal 1000, the MFP 2000, and the server machine 3000.

The user terminals 1000-1002 (see FIG. 1) are identical to one another in functions according to the present invention. The user terminal 1000 is, thus, described herein as a typical example.

The user terminal 1000 includes an operation portion 1100 and a print job generation/transmission portion 1200.

A CPU of the user terminal 1000 executes programs stored in a memory of the user terminal 1000; thereby a part or the whole of the functions of the individual portions of the user terminal 1000 is implemented as described below.

The operation portion 1100 is configured of a display, a keyboard, and the like, and has a function to receive a command from a user and to perform a process in accordance with the command. To be specific, the operation portion 1100 receives, from the user, a print command in which print data of a document or the like is specified, and issues a command to the print job generation/transmission portion 1200.

The print job generation/transmission portion 1200 serves to generate a print job and to transmit the print job to the server machine 3000 in accordance with the command issued by the operation portion 1100. In short, the print job generation/transmission portion 1200 is a so-called printer driver.

The MFP 2000 includes a control portion 2100, an operation portion 2200, an access information obtaining portion 2300, a print job accessing portion 2400, a print process portion 2500, a print job completion informing portion 2600, and a log-on information storage portion 2700.

The CPU 20*a* of the MFP 2000 executes programs stored in a memory such as the hard disk 20*d* of the MFP 2000; thereby a part or the whole of the functions of the individual portions of the MFP 2000 is implemented as described below.

The control portion 2100 performs general control processing necessary for the MFP 2000, and control processing unique to the present invention. For example, in the case where the control portion 2100 receives a print command from a user, the control portion 2100 performs control such that a request for access information is made to the server machine 3000.

The operation portion 2200 includes the operational panel 20*f* and the IC card reader 20*i*. The operation portion 2200 serves to display, on the operational panel 20*f*, a display screen depending on operation performed by a user, and to receive a command given by the user.

The operation portion 2200 also serves to obtain log-on information, specifically, a user ID and a password from a user who intends to use the MFP 2000. In particular, a log-on information entry screen is displayed on the operational panel 20*f*, and a user ID and the like entered by the user touching the touchscreen are obtained. Alternatively, a user ID and the like read out by the IC card reader 20*i* from an IC card held thereover are obtained.

The operation portion 2200 also serves to refer to a plurality of pieces of user information stored in the log-on information storage portion 2700, and to perform authentication of the obtained log-on information. If the log-on information is indicated in any one of the plurality of pieces of the user information, then it means that the authentication is successful. If the log-on information is not indicated therein, then it means that the authentication fails. Only when the authentication is successful, the operation portion 2200 informs the control portion 2100 of the log-on information.

The access information obtaining portion 2300 serves to obtain access information of a user who has logged onto the MFP 2000. To be specific, the access information obtaining portion 2300 informs the server machine 3000 of log-on information of the user who has logged onto the MFP 2000, and receives, from the server machine 3000, access information of a user identified by the log-on information. The access information obtaining portion 2300 conveys the access information thus received to the print job accessing portion 2400, and requests the same to perform printing.

The print job accessing portion 2400 has a function to use the access information received from the access information obtaining portion 2300 to read out a print job, delete a print job, or the like. The print job accessing portion 2400 conveys the print job thus read out to the print process portion 2500, and requests the same to perform printing. Further, when receiving a notification indicating that printing has been completed from the print process portion 2500, the print job accessing portion 2400 deletes a print job for which printing has been completed.

In the case where printing is completely performed based on a print job specified by a user through the operation portion 2200 and the control portion 2100, the print job accessing portion 2400 informs the print job completion informing portion 2600 that the printing has been completed.

The print process portion 2500 serves to execute the print job received from the print job accessing portion 2400. To be specific, the print process portion 2500 prints, onto paper, an image reproduced based on print data contained in the print job. After that, the print process portion 2500 informs the print job accessing portion 2400 that the printing has been finished.

When receiving, from the print job accessing portion 2400, the information indicating that the printing has been finished, the print job completion informing portion 2600 serves to inform the server machine 3000 of the fact together with information for identifying the subject MFP 2000.

The log-on information storage portion 2700 serves to store, therein, user information that is information on a user. Such user information is created in advance by a system administrator.

The server machine 3000 includes a print job storage portion 3100, an access information transmission portion 3200, a print job accessing portion 3300, a print completion processing portion 3400, an access information generating portion 3500, a management information storage portion 3600, a for-user storage portion 3700, a for-MFP storage portion 3800, and an initialization processing portion 3900.

A CPU of the server machine 3000 executes programs stored in a memory such as a hard disk of the server machine 3000; thereby a part or the whole of the functions of the individual portions of the server machine 3000 is implemented as described below.

The for-user storage portion 3700 serves to store, therein, print jobs sent by users. In particular, the for-user storage portion 3700 has storage areas on a user-by-user-basis. In the case where a user who has never used the server machine 3000 before sends a print job thereto, the print job storage portion 3100 produces an area for the user. Thus, at the time of the start of operation of the pull printing system 100, no areas are produced for users.

The for-MFP storage portion 3800 has storage areas on an MFP-by-MFP basis of the pull printing system 100. Print jobs are temporarily stored in the storage areas. In this embodiment, the for-MFP storage portion 3800 stores the individual storage areas for the MFP 2000, the MFP 2001, and the MFP 2002.

The initialization processing portion 3900 serves to perform a process for initializing the server machine 3000 of the pull printing system 100. To be specific, the initialization processing portion 3900 performs registration necessary for communication between the server machine 3000 and the MFP 2000-MFP 2002 as well as the user terminal 1000-user terminal 1002 in accordance with details entered by the system administrator. The initialization processing portion 3900 also creates, in the for-MFP storage portion 3800, a storage area for storing print jobs of each of the MFP 2000-MFP 2002, generates access information for each of the storage areas, and causes the management information storage portion 3600 to store the access information thus generated.

The print job storage portion 3100 serves to receive a print job sent from the print job generation/transmission portion 1200 of the user terminal 1000 and save the print job in a storage area for a user who has sent the print job. The print job contains information indicating the user who has sent the subject print job. In the case where the for-user storage portion 3700 does not have a storage area for the user who has sent the print job, the print job storage portion 3100 serves to generate a storage area for the user. Specifically, the print job storage portion 3100 generates a folder for the user. At this time, the print job storage portion 3100 does not generate access information while it generates a folder for the user.

The access information transmission portion 3200 serves to receive log-on information from the access information obtaining portion 2300 of the MFP 2000, refer to the management information storage portion 3600, and inform the access information obtaining portion 2300 of access information for the user who has logged onto the MFP 2000. At this time, if a storage area for the user who has logged onto the MFP 2000 is present, and no access information for the user is present, then the access information transmission portion 3200 moves a print job stored in the storage area for the user to a storage area for the MFP 2000, and conveys access information for the MFP 2000 to the access information obtaining portion 2300. Note that a dot-dash line in FIG. 3 represents control of the movement of the print job. The "movement" herein means copying a print job into a movement destination, and then, deleting a print job that is the copy source. The deletion may be performed immediately after copying the print job, or, alternatively, may be performed after a predetermined amount of time has elapsed.

The print job accessing portion 3300 serves to read out a predetermined print job stored in the for-user storage portion 3700 or the for-MFP storage portion 3800, or delete the same in accordance with a request from the print job accessing portion 2400 of the MFP 2000.

The print completion processing portion 3400 serves to perform a print completion process of the MFP 2000 in response to the receipt of the information indicating that printing has been finished from the print job completion informing portion 2600 of the MFP 2000. To be specific, if a print job still remains in a print job storage portion for the MFP 2000, the print completion processing portion 3400 moves the remaining print job to a storage portion for the user.

The access information generating portion 3500 serves to generate access information for a user whose storage area is present and whose access information is not present. It is assumed that, in this embodiment, the access information generating portion 3500 operates during a period of time set by the system administrator. Such a period of time is, for example, a period of time during which the number of print jobs sent by users is small.

The management information storage portion 3600 serves to store, therein, management data for user storage areas, or the like, and management data for MFP storage areas. The management data will be described below in the [DATA] section.

[DATA]

The following is a description of principal data used in the pull printing system 100 of this embodiment, with reference to FIGS. 4-6B.

Figure 4:
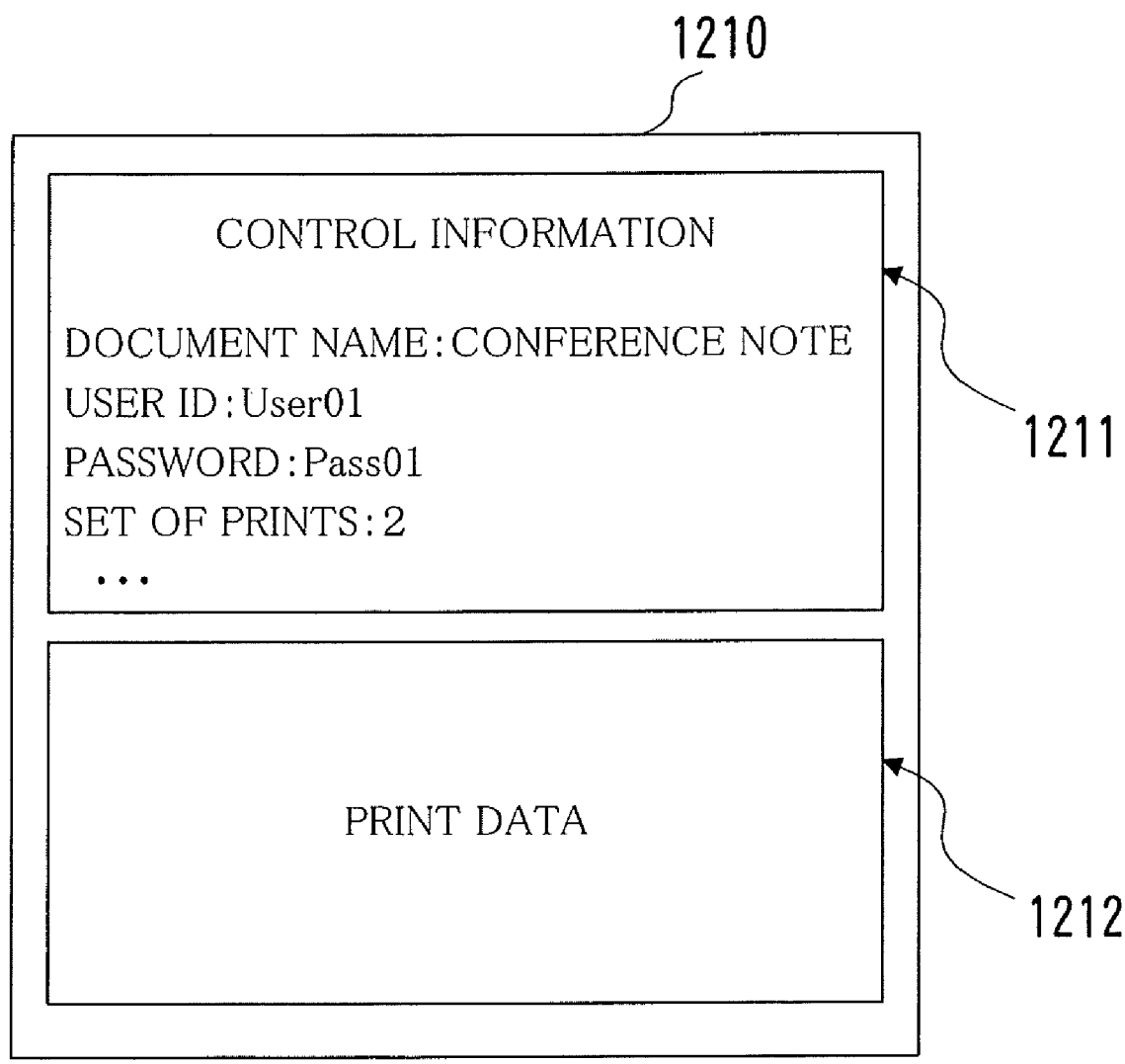
FIG. 4 is a diagram illustrating an example of the structure and details of a print job.

FIG. 4 is a diagram illustrating an example of the structure and details of a print job 1210.

The print job 1210 includes control information 1211 and print data 1212.

The control information 1211 contains information about a user ID, a password, a document name, number of prints, and the like.

The user ID is a name or the like of a user who has sent the subject print job 1210, and is an identifier of the user.

The password is information for verifying the authenticity of a user identified by the user ID.

The document name is an identifier of the print job 1210 for the user. The number of prints indicates the set of prints based on the print data 1212.

The print data 1212 is data of, for example, a document to be printed, and is provided in a predetermined format such as Joint Photographic Exchange Group (JPEG), Graphic Interchange Format (GIF), or the like.

FIG. 5 is a diagram illustrating an example of the structure and details of log-on data 2710.

The log-on data 2710 is stored in the log-on information storage portion 2700 at the time when the operation of the pull printing system 100 is started.

The log-on data 2710 includes a user ID 2711, a password 2712, and a function 2713. The log-on data 2710 contains information about all the users who are permitted to use the MFP 2000. One record having the structure described above is registered for one user.

The user ID 2711 is an identifier of a user permitted to use the MFP 2000.

The password 2712 is information for verifying the authenticity of a user identified by the user ID 2711.

The function 2713 indicates functions of the MFP 2000 that a user identified by the user ID 2711 is allowed to use. If "Yes" is specified in the function 2713, the user is allowed to use the function. If "No" is specified therein, the user is not allowed to use the function.

FIG. 6A is a diagram illustrating an example of the structure and details of user management data 3610, and FIG. 6B is a diagram illustrating an example of the structure and details of MFP management data 3620.

The user management data 3610 and the user management data 3620 are stored in the management information storage portion 3600.

Only a part of the user management data 3610 is already created at the start of the operation of the pull printing system 100, and the user management data 3610 is modified during the operation thereof. On the other hand, the whole of the user management data 3620 is already created at the start of the operation of the pull printing system 100.

The user management data 3610 includes a user ID 3611, a password 3612, an account 3613, a folder path 3614, and a virtual directory 3615. The user management data 3610 contains information about all the users who are permitted to use the server machine 3000. One record having the structure described above is registered for one user.

The user ID 3611 is an identifier of a user permitted to use the server machine 3000.

The password 3612 is information for verifying the authenticity of a user identified by the user ID 3611.

The account 3613 is information indicating that a user identified by the user ID 3611 is authorized to use the server machine 3000. The account 3613 is used when the user uses the server machine 3000.

The folder path 3614 indicates a folder as a storage area into which a print job sent by a user identified by the user ID 3611 is stored.

The virtual directory 3615 indicates a directory for a device other than the server machine 3000 to access a print job stored in a folder corresponding to the folder path 3614.

Only the user ID 3611 and the password 3612 are registered at the time when the operation of the pull printing system 100 is started. The folder path 3614 is generated at the time when the first print job is received from a registered user. The account 3613 and the virtual directory 3615 are generated at the time when the access information generating portion 3500 operates at a time set by the system administrator.

A record having "User03" in the user ID 3611 is taken as an example. The folder path 3614 of the record indicates "C:¥usr03/job". This means that a user identified by "User03" has ever sent a print job. Referring to the record, "Ausr03" and "/UO3" are specified in the account 3613 and the virtual directory 3615 respectively. This implies that the access information generating portion 3500 has ever operated. On the other hand, a record having "User01" in the user ID 3611 is taken as an example. The folder path 3614 of the record indicates "C:¥usr01/job". This implies that a user identified by "User01" has ever sent a print job. Since nothing is specified in the account 3613 and the virtual directory 3615 of the record, it implies that the access information generating portion 3500 has not yet operated. Incidentally, "-" means that nothing is registered in the corresponding field.

Description is provided below of the MFP management data 3620.

The MFP management data 3620 includes an MFP ID 3621, a password 3622, an account 3623, a folder path 3624, and a virtual directory 3625.

The MFP management data 3620 is management data for MFP, while the user management data 3610 is management data for user. The structure of the MFP management data 3620 is the same as that of the user management data 3610, except that the MFP management data 3620 contains the MFP ID 3621 instead of the user ID 3611 contained in the user management data 3610.

The MFP ID 3621 is an identifier of the MFP 2000.

The password 3622, the account 3623, the folder path 3624, and the virtual directory 3625 are respectively equivalent to the password 3612, the account 3613, the folder path 3614, and the virtual directory 3615 of the user management data 3610.

All the details of the MFP management data 3620 are already specified at the time when the operation of the pull printing system 100 is actually started.

[Indication on Display]

Descriptions are given below of main indications on a display used in the pull printing system 100 of this embodiment, with reference to FIGS. 7 and 8. The indications on a display described herein are examples of indications made on the operational panel 20f of the MFP 2000.

Figure 7:
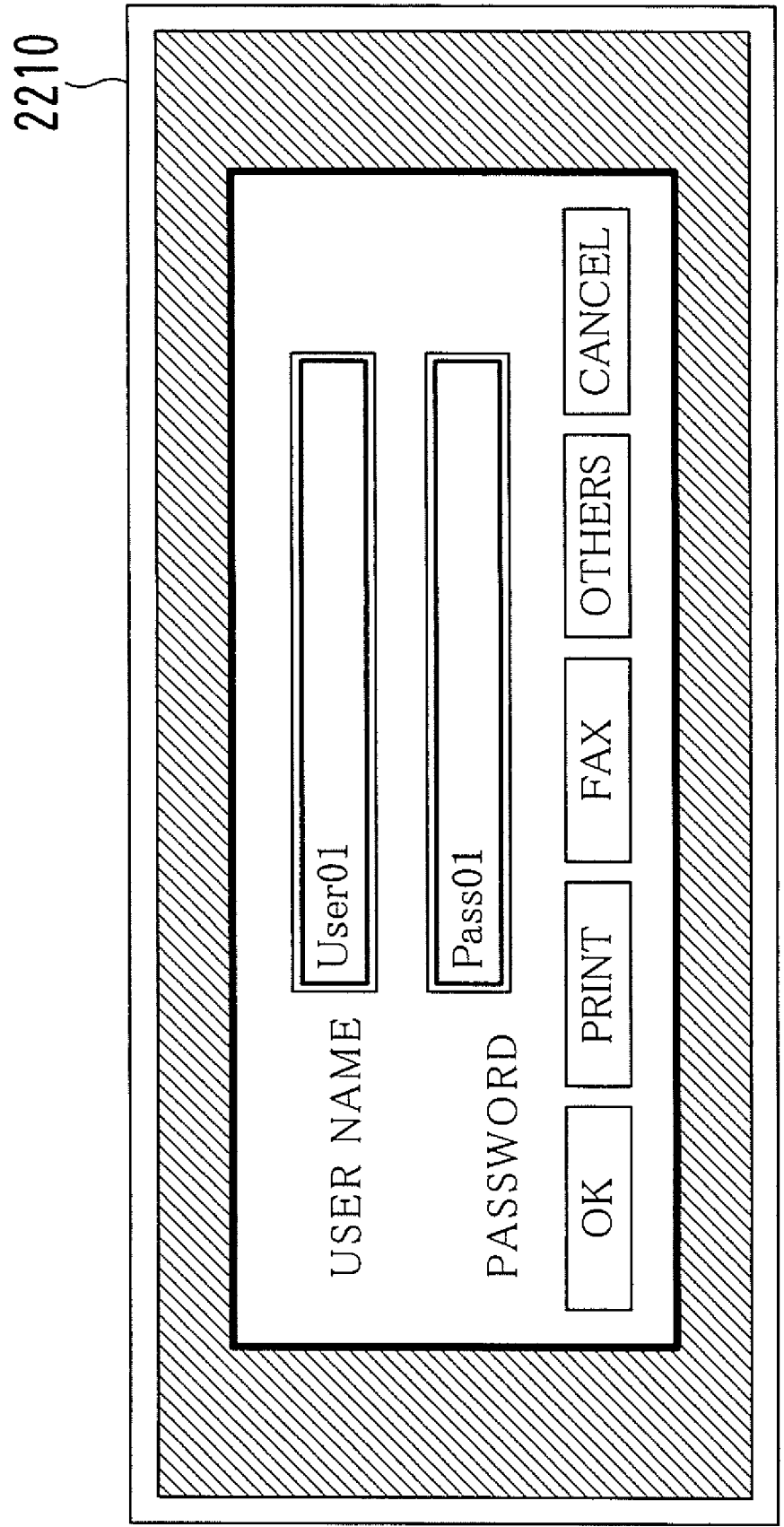
FIG. 7 is a diagram illustrating an example of a log-on screen.

FIG. 7 is a diagram illustrating an example of a log-on screen 2210.

A user enters, on the log-on screen 2210, a user name and a password in the individual entry fields, and then presses an "OK" button.

Figure 8:
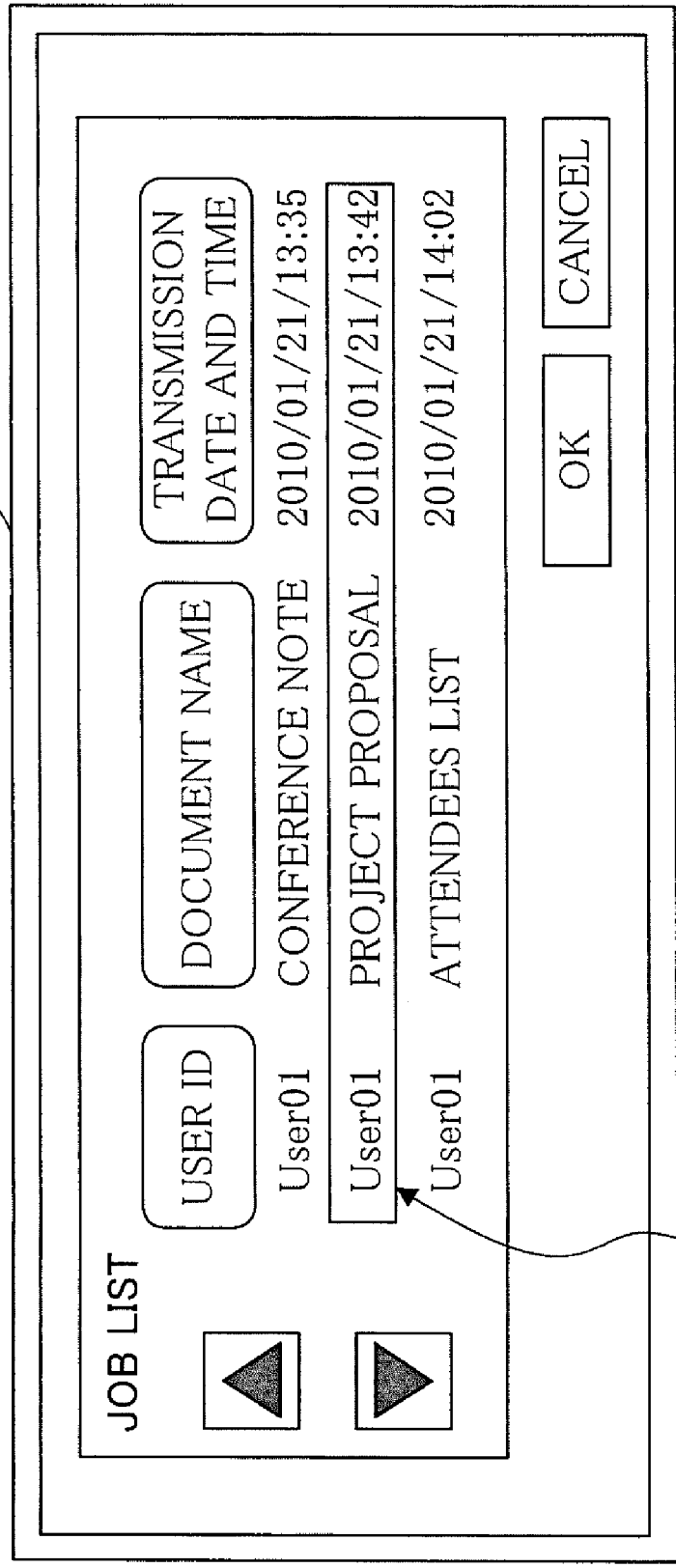
FIG. 8 is a diagram illustrating an example of a job list screen.

FIG. 8 is a diagram illustrating an example of a job list screen 2220.

The job list screen 2220 is to display a list of print jobs of a user who has logged onto the MFP 2000. The user moves a cursor 2221 to select a desired print job. In the illustrated example, a print job having a document name of "project proposal" is selected by moving the cursor 2221. If the user presses an "OK" button on the job list screen 2220, then a process such as a printing process based on the selected print job is performed.

[Operation]

Description is provided below of operation performed in the pull printing system 100 of this embodiment, with reference to FIGS. 9-12.

The following four processes are described herein.

The first one is an initialization process and a print job accumulation process by the pull printing system 100. The second one is a process for the MFP 2000 instructed to perform printing by a user to acquire access information. The third one is a process for the MFP 2000 to access a print job and to execute the print job. The fourth one is an access information generating process performed at a time specified by a system administrator.

[Initialization Process and Print Job Accumulation Process]

Figure 9:
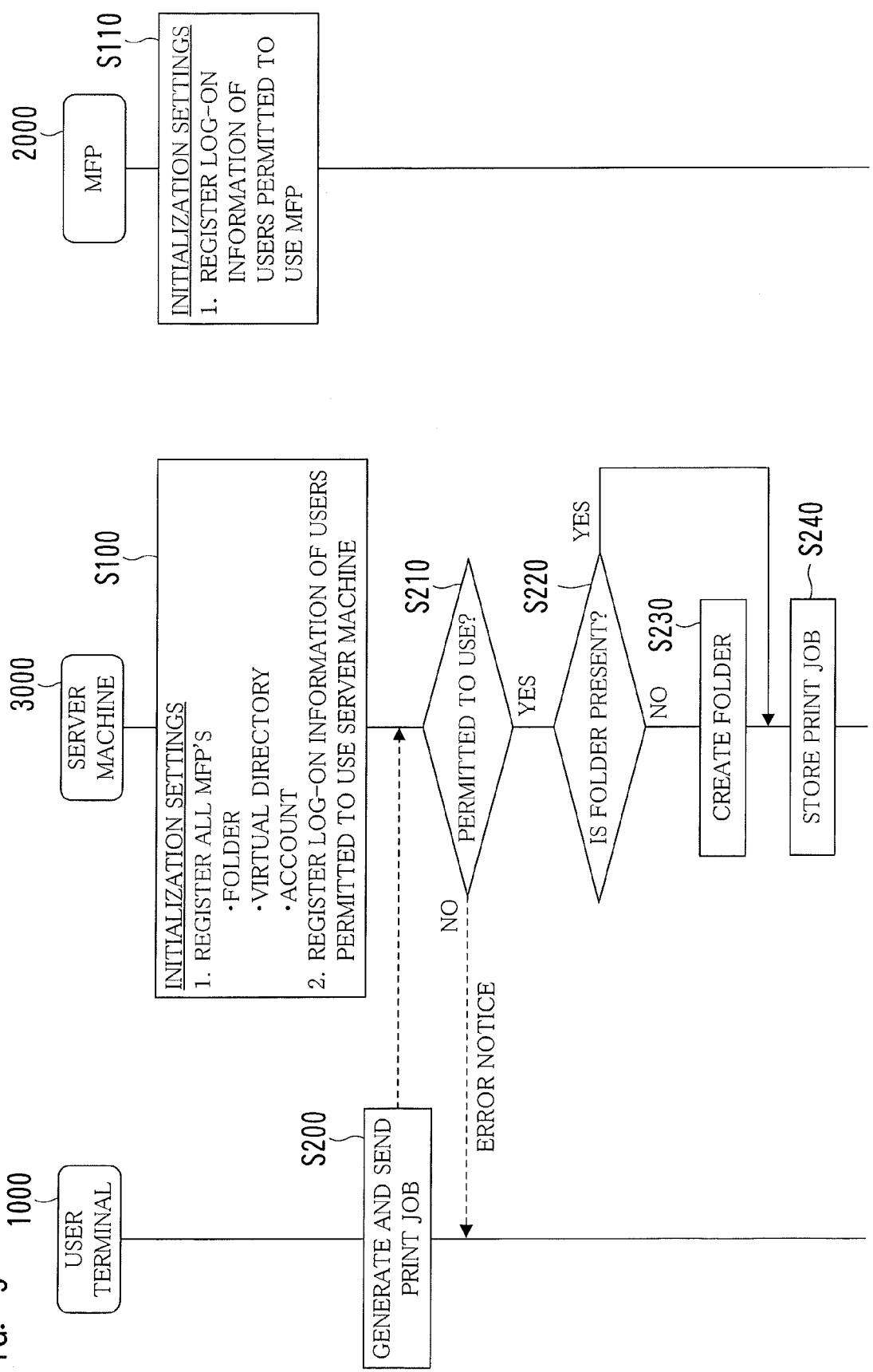
FIG. 9 is a flowchart depicting an example of an initialization process and a print job accumulation process.

FIG. 9 is a flowchart depicting an example of an initialization process and a print job accumulation process performed in the pull printing system 100.

A system administrator activates the initialization processing portion 3900 via an interface of the server machine 3000 in order to prepare for the operation of the pull printing system 100.

The system administrator enters, to the initialization processing portion 3900, the individual MFP IDs and passwords of the MFP 2000-MFP 2002, and information necessary for communication. The system administrator also enters the individual user IDs and passwords of the user terminals 1000 and the like that are terminals of users authorized to use the server machine 3000, and information necessary for communication, and then to instruct the initialization processing portion 3900 to perform an initialization process.

Responding to the instructions, the initialization processing portion 3900 performs an initialization process for registering the MFP 2000, the user terminal 1000, and the like (Step S100).

To be specific, the initialization processing portion 3900 generates storage areas, i.e., folders, for storing the individual print jobs of the MFP 2000-MFP 2002. The initialization processing portion 3900 also generates access information, i.e., accounts and virtual directories, of the MFP 2000-MFP 2002. The initialization processing portion 3900 creates the MFP management data 3620 (see FIG. 6B) based on the generated folders and account information, and stores the MFP management data 3620 into the management information storage portion 3600.

For example, the initialization processing portion 3900 registers, in the MFP management data 3620, a record in which the identifier "MFP-01" and the password "Mpass01" of the MFP 2000 whose information is entered by the system administrator are respectively specified in the MFP ID 3621 and the password 3622, the generated folder "C:¥mfp01/job" is specified in the folder path 3624, and the generated account "Amfp01" and virtual directory "/M01" are respectively specified in the account 3623 and the virtual directory 3625.

Likewise, the initialization processing portion 3900 creates records for the MFP 2001 and the MFP 2002, and registers the records in the MFP management data 3620.

The initialization processing portion 3900 also registers, in the user management data 3610, a record in which a user ID and a password entered by the system administrator are respectively specified in the user ID 3611 and the password 3612.

For example, the initialization processing portion 3900 registers, in the user management data 3610, a record in which the user ID "User01" and the password "Pass01" of the user terminal 1000 whose information is entered by the system administrator are respectively specified in the user ID 3611 and the password 3612.

Likewise, the initialization processing portion 3900 registers user IDs or the like of other user terminals in the user management data 3610.

After performing the initialization process of the server machine 3000, the system administrator makes settings (Step S110), in the MFP 2000-MFP 2002, of user IDs, passwords, allowed functions, and the like of users who are permitted to use the individual MFPs. To be specific, the system administrator creates log-on data 2710 (see FIG. 5) for the individual MFPs, and stores the created log-on data 2710 in the log-on information storage portion 2700.

After the initialization settings for the server machine 3000 and the MFP 2000-MFP 2002 are completed, the operation of the pull printing system 100 is started.

A user of the user terminal 1000 specifies a document and performs operation for printing the document.

The operation portion 1100 that has detected the operation for printing informs the print job generation/transmission portion 1200 of the document thus specified, and instructs the same to generate a print job and send the print job to the server machine 3000.

Upon receiving the instructions, the print job generation/transmission portion 1200 generates a print job 1210 (see FIG. 4) based on which the specified document is printed, and sends the print job 1210 to the server machine 3000 (Step S200). The print job 1210 is, for example, a print job 1210 having the user ID "User01" and the password "Pass01" in the control information 1211.

Upon receiving the print job 1210, the print job storage portion 3100 of the server machine 3000 makes a determination as to whether or not the received print job 1210 has been sent by a user who is permitted to use the subject server machine 3000 (Step S210).

To be specific, the print job storage portion 3100 makes the determination based on whether or not the user management data 3610 (see FIG. 6A) includes a record in which the user ID and the password indicated in the control information 1211 of the received print job 1210 are specified in the user ID 3611 and the password 3612.

If the user management data 3610 does not include such a record, then the print job storage portion 3100 determines that the received print job 1210 has been sent by a user who is not permitted to use the server machine 3000 (Step S210: No), and sends an error message to the user terminal 1000.

In contrast, if the user management data 3610 includes such a record, then the print job storage portion 3100 determines that the received print job 1210 has been sent by a user who is permitted to use the server machine 3000 (Step S210: Yes), and then, determines whether or not a storage area is provided for the user corresponding to the received print job 1210, or, in other words, whether or not a folder is created for the user (Step S220).

To be specific, the print job storage portion 3100 determines whether or not a folder is created based on whether or not a folder is specified in the folder path 3614 of a record in which the user ID contained in the control information 1211 of the received print job 1210 is specified in the user ID 3611.

If such a folder is specified in the folder path 3614, then the print job storage portion 3100 determines that a folder is created (Step S220: Yes), and saves the received print job 1210 to the folder specified in the folder path 3614 (Step S240).

On the other hand, if no folder is specified in the folder path 3614, or, in other words, if "-" is specified therein (Step S220: No), then the print job storage portion 3100 creates a folder for a user corresponding to the user ID contained in the received print job 1210 (Step S230). The print job storage portion 3100, then, specifies a path to the created folder in the folder path 3614, and stores the received print job 1210 into the created folder (Step S240).

Suppose that, for example, the print job storage portion 3100 receives a print job 1210 containing control information 1211 in which "User01" and "Pass01" are specified as the user ID and the password respectively. In such a case, the print job storage portion 3100 stores the received print job 1210 into a folder corresponding to the folder path "C:¥usr01/job". This is because "User01" and "Pass01" are registered in the user management data 3610, and "C:¥usr01/job" is specified in the corresponding folder path 3614.

When receiving print jobs 1210 sent by users simultaneously at the start of the operation of the pull printing system 100, the server machine 3000 preferably performs a process for creating folders for the users and storing the received print jobs 1210 thereinto. This reduces a load on the server machine 3000 at the start of the operation of the pull printing system 100.

[Access Information Acquisition Process]

Figure 10:
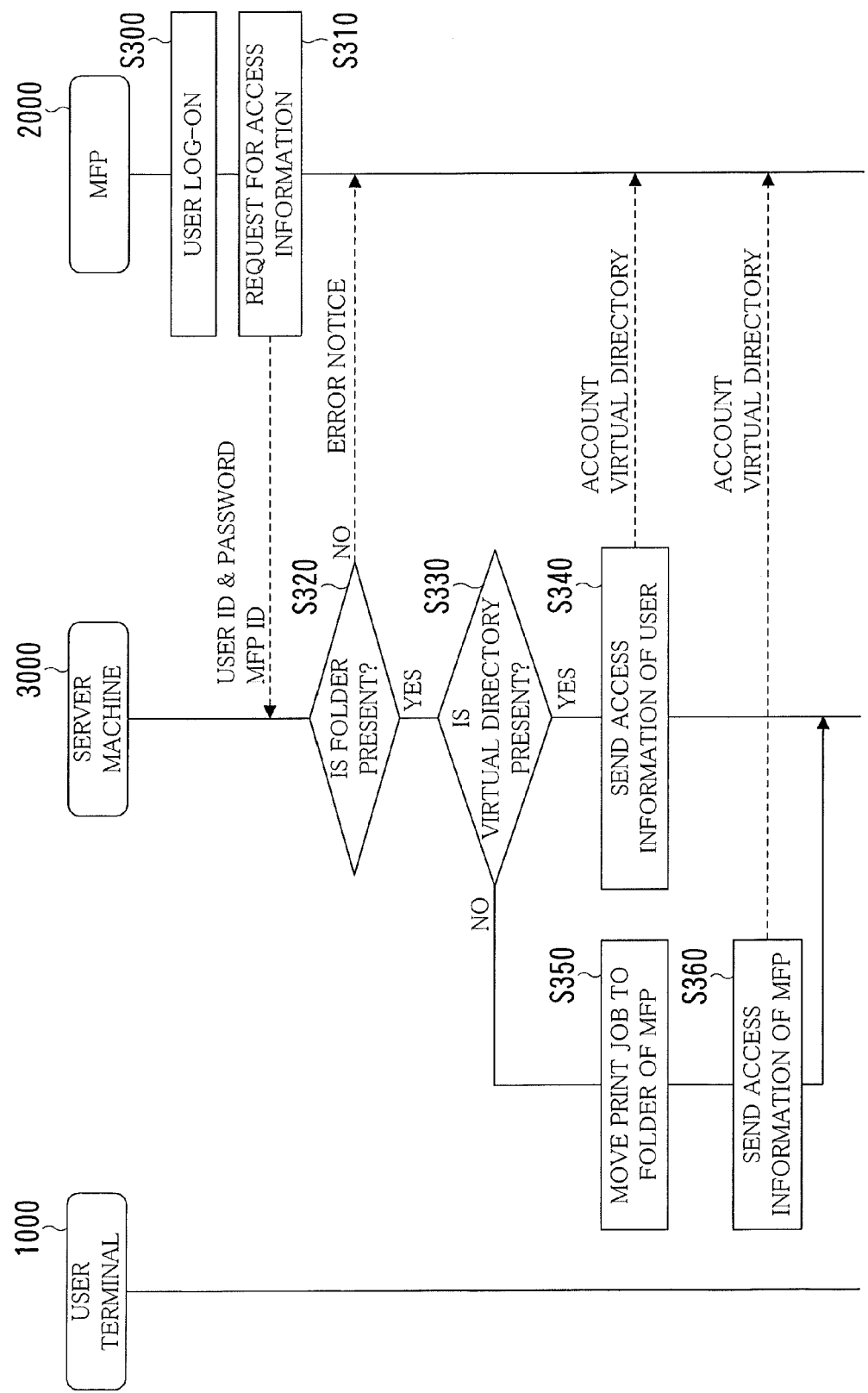
FIG. 10 is a flowchart depicting an example of an access information acquisition process.

FIG. 10 is a flowchart depicting a process for the MFP 2000 to acquire access information used for reading out a print job 1210.

A user who has operated the user terminal 1000 and sent a print job 1210 comes to the location of the MFP 2000 to obtain a printed matter.

The user confirms that the log-on screen 2210 (see FIG. 7) is displayed on the operational panel 20f of the MFP 2000. The user, then, enters his/her user ID and password that are log-on information, and presses a "print" button.

The operation portion 2200 of the MFP 2000 detects that the user ID and password have been entered and the "print" button has been pressed. The operation portion 2200 checks whether or not the user ID and password thus detected are registered as the user ID 2711 and the password 2712 of the log-on data 2710 stored in the log-on information storage portion 2700. If the user ID and password thus detected are not registered, then the operation portion 2200 determines that the authentication fails. In contrast, if the user ID and password thus detected are registered, then the operation portion 2200 refers to "print" of the function 2713 of a record in which the detected user ID and password are registered. If "Yes" is specified in the "print", then the operation portion 2200 determines that the authentication is successful. If "-" is specified therein, then the operation portion 2200 determines that the authentication fails.

When determining that the authentication fails, the operation portion 2200 displays the log-on screen 2210 in which the entry area is cleared on the operational panel 20f, and finishes the process.

On the other hand, when determining that the authentication is successful, the operation portion 2200 conveys the user ID and the password to the control portion 2100 (Step S300).

Upon receiving the user ID and the password, the control portion 2100 conveys the same to the access information obtaining portion 2300, and requests the access information obtaining portion 2300 to acquire access information.

Upon receiving the request, the access information obtaining portion 2300 sends the received user ID and password to the access information transmission portion 3200 of the server machine 3000, and makes a request for access information (Step S310). At this time, the access information obtaining portion 2300 also sends an identifier and a password of the subject MFP 2000, e.g., "MFP-01" and "Mpass01", to the access information transmission portion 3200.

Responding to this operation, the access information transmission portion 3200 of the server machine 3000 confirms whether or not a folder is specified in the folder path 3614 of a record in which the received user ID and password are specified in the user ID 3611 and the password 3612 respectively. In short, the access information transmission portion 3200 confirms whether or not a folder is present (Step S320).

If no folder is present (Step S320: No), then the access information transmission portion 3200 sends information indicating an error to the access information obtaining portion 2300 of the MFP 2000.

In contrast, if a folder is present (Step S320: Yes), then the access information transmission portion 3200 confirms whether or not a directory is specified in the virtual directory 3615 of the corresponding record (Step S330).

If a directory is specified therein (Step S330: Yes), then the access information transmission portion 3200 sends, to the MFP 2000, access information that includes an account specified in the account 3613 and a directory specified in the virtual directory 3615 of the corresponding record (Step S340).

In the case where, for example, the received user ID and password are "User03" and "Pass03", respectively, the access information transmission portion 3200 sends "Ausr03" and "/UO3" as the account information (see FIG. 6A).

If no directory is specified in the virtual directory 3615 of the corresponding record (Step S330: No), then the access information transmission portion 3200 moves, to a storage area for the MFP 2000, all print jobs 1210 stored in a folder specified in the folder path 3614 of the corresponding record. Stated differently, the access information transmission portion 3200 stores the print jobs 1210 into a folder specified in the folder path 3624 of a record in which the received MFP identifier and password are respectively specified in the MFP ID 3621 and the password 3622 (Step S350). Since a folder created in advance is specified in the folder path 3624, it is unnecessary to create a folder each time.

At this time, the access information transmission portion 3200 stores, into a work memory, the log-on information and the sent access information in association with the sent MFP identifier.

In the case where, for example, the received MFP identifier and password are "MFP-01" and "Mpass01", respectively, and "User01" is specified in the user ID 3611, the access information transmission portion 3200 moves all the print jobs 1210 stored in the folder corresponding to "C¥usr01/job" to the folder corresponding to "C:¥mfp01/job" (see FIGS. 6A and 6B).

Subsequently, the access information transmission portion 3200 sends, to the MFP 2000, access information on a storage area for the MFP to which the print jobs 1210 have been moved. To be specific, the access information transmission portion 3200 sends, to the MFP 2000, access information including an account and a directory respectively specified in the account 3623 and the virtual directory 3625 of a record in which the received MFP identifier and password are specified in the MFP ID 3621 and the password 3622 (Step S360).

In the case where, for example, the received MFP identifier and password are "MFP-01" and "MPass01", respectively, the access information transmission portion 3200 sends "Amfp01" and "/M01" as the account information to the MFP 2000 (see FIG. 6B).

[Print Job Execution Process]

FIG. 11 is a flowchart depicting a print job execution process through which the MFP 2000 reads out a print job 1210 to perform printing.

The access information obtaining portion 2300 of the MFP 2000 receives the access information from the access information transmission portion 3200 of the server machine 3000. The access information obtaining portion 2300, then, provides the print job accessing portion 2400 with the received access information, and requests the same to perform printing.

Responding to the request, the print job accessing portion 2400 sends the received access information to the print job accessing portion 3300 of the server machine 3000, and requests a list of print jobs 1210 from the print job accessing portion 3300 (Step S400).

Upon receiving the request, the print job accessing portion 3300 finds out a folder corresponding to the virtual directory of the received access information with reference to the user management data 3610 and the MFP management data 3620.

To be specific, the print job accessing portion 3300 searches for a record in which the account and the virtual directory of the received access information are respectively specified in the account 3613 and the virtual directory 3615. The print job accessing portion 3300, then, finds out a folder specified in the folder path 3614 of the record obtained by the search.

If such a record is not registered in the user management data 3610, then the print job accessing portion 3300 searches for a record in which the account and the virtual directory of the access information are respectively specified in the account 3623 and the virtual directory 3625. The print job accessing portion 3300, then, finds out a folder specified in the folder path 3624 of the record obtained by the search.

After finding out the folder, the print job accessing portion 3300 reads out information on document names contained in the control information 1211 of all the print jobs 1210, and makes a list of the information. The print job accessing portion 3300, then, sends the list to the print job accessing portion 2400 of the MFP 2000 (Step S410).

Upon receiving the list, the print job accessing portion 2400 displays the job list screen 2220 (see FIG. 8) showing the received list on the operational panel 20f through the control portion 2100.

A user selects a document to be printed on the job list screen 2220 displayed, and presses an "OK" button. Referring to FIG. 8, "project proposal" is selected by moving the cursor 2221. The user presses the "OK" button. If the user intends to print a plurality of documents, he/she selects the plurality of documents and presses the "OK" button.

When detecting that the "OK" button has been pressed, the operation portion 2200 conveys the selected document to the print job accessing portion 2400 (Step S420).

Upon receiving the selected document, the print job accessing portion 2400 requests the print job accessing portion 3300 to read out a print job 1210 corresponding to the selected document (Step S430).

Responding to the request, the print job accessing portion 3300 reads out the print job 1210 from the folder that has been found out upon making the list, and sends the print job 1210 to the print job accessing portion 2400 (Step S440).

Upon receiving the print job 1210, the print job accessing portion 2400 provides the print process portion 2500 with the print job 1210, and requests the same to perform printing.

Responding to the request, the print process portion 2500 prints an image onto paper based on the print data 1212 of the print job 1210, and outputs the paper (Step S450).

Subsequently, the print process portion 2500 informs the print job accessing portion 2400 that printing has been finished.

Upon receiving the information, the print job accessing portion 2400 requests the print job accessing portion 3300 to delete the print job 1210 based on which the printing has been finished (Step S460).

The print job accessing portion 3300 receives the request and deletes the print job 1210 that has been sent to the print job accessing portion 2400 (Step S470).

Note that, if the user has selected a plurality of documents, the process from Step S430-Step S470 is repeated.

When the document selected by the user is completely printed, the print job accessing portion 2400 asks the print job completion informing portion 2600 to perform a completion process.

Responding to this operation, the print job completion informing portion 2600 asks the print completion processing portion 3400 of the server machine 3000 to perform a completion process (Step S480). At this time, the print job completion informing portion 2600 sends the MFP identifier to the print completion processing portion 3400.

Subsequently, the print completion processing portion 3400 acquires, from the access information transmission portion 3200, log-on information and access information that are stored in the work memory in association with the MFP identifier received by the access information transmission portion 3200.

The print completion processing portion 3400 determines whether or not the access information thus acquired is access information for MFP (Step S490). To be specific, if the access information includes an account and a virtual directory specified in the account 3623 and the virtual directory 3625, then the print completion processing portion 3400 determines that the acquired access information is access information for MFP.

If it is determined that the acquired access information is access information for MFP (Step S490: Yes), then the print completion processing portion 3400 confirms whether or not the virtual directory of the access information still has print jobs 1210 (Step S500).

If print jobs 1210 still remain in the virtual directory (Step S500: Yes), then the print completion processing portion 3400 moves all the print jobs 1210 stored in the virtual directory to a folder for a user corresponding to the user ID contained in the log-on information, i.e., a folder specified in the folder path 3614 of a record in which the user ID of the log-on information is specified in the user ID 3611 (Step S510).

On the other hand, if it is not determined that the acquired access information is access information for MFP (Step S490: No), or, alternatively, if no print jobs 1210 remain in the virtual directory of the access information (Step S500: No), then the print completion processing portion 3400 finishes the process.

Thereby, it is possible to securely keep, in a folder for user, print jobs 1210 for which printing has not been performed during a period of time when the user logs on the MFP 2000 this time.

[Access Information Generating Process]

FIG. 12 is a flowchart depicting a process for the server machine 3000 to generate access information for a user.

The system administrator, first, sets a time to start generating access information for a user. The system administrator specifies, for example, a time at which the number of print jobs received by the server machine is small, e.g., "23:00 every Saturday".

The access information generating portion 3500 obtains the time specified by the system administrator via the interface. The access information generating portion 3500, then, sets a timer in such a manner that the access information generating portion 3500 runs at the specified time (Step S600).

When the specified time is reached, the access information generating portion 3500 is activated by the timer (Step S610: Yes). The access information generating portion 3500 searches, in the user management data 3610, for a record in which a folder is specified in the folder path 3614 and no account is specified in the account 3613 (Step S620).

If such a record is found out (Step S620: No), then the access information generating portion 3500 generates an account for a user identified by a user ID specified in the user ID 3611 of the record to specify the account in the account 3613, and generates a virtual directory for the user to specify the virtual directory in the virtual directory 3615 (Step S540).

The access information generating portion 3500 repeats the process of Step S620 and Step S630 until the search for all the records registered in the user management data 3610 is completed (Step S540: No).

If the search for all the records registered in the user management data 3610 is completed (Step S540: Yes), then the access information generating portion 3500 finishes the process, and waits for the timer to activate the subject access information generating portion 3500 at the next specified time (Step S510: No).

Access information is generated while the server machine 3000 is available for the generation. Thus, it is possible to establish a system in which access information for all users are generated with a load on the server machine 300 reduced at the start of the operation of the pull printing system 100.

Although the embodiment of the present invention has been described above, the present invention is not limited thereto. The following arrangement is possible.

1) In the embodiment described above, the access information generating portion 3500 starts at a time set by a system administrator. Instead, however, the access information generating portion 3500 may start at a time other than the set time, e.g., at a time in accordance with a command given by the system administrator.

In the embodiment discussed above, the access information generating portion 3500 collectively generates access information for users. Instead, however, another configuration is possible in which, after a predetermined amount of time, e.g., one week, has elapsed from the start of the operation, access information for a user who has sent a print job for the first time is generated concurrently with the generation of a folder for the user. The reason for this is that not so many users send print jobs at one time after a predetermined amount of time has elapsed from the start of the operation.

2) According to the embodiment discussed above, if access information on user storage area is not present, the server machine moves a print job stored in a user storage area to an MFP storage area. Then, when receiving a print completion notification from an MFP, the server machine moves print jobs still remaining in the MFP storage area to the user storage area. However, another method can be employed. For example, if access information on user storage area is not present, the server machine copies a print job stored in a user storage area to an MFP storage area. Then, when receiving a print completion notification from an MFP, the server machine deletes, from the user storage area, print jobs other than print jobs remaining in the MFP storage area.

3) The whole or a part of the individual elements of the pull printing system shown in, for example, FIG. 3 may be realized in the form of a one-chip integrated circuit or multi-chip integrated circuits.

4) The whole or a part of the individual elements in the pull printing system shown in, for example, FIG. 3 may be realized by a computer program, or may be implemented in any other formats.

In the case of a computer program, a computer is preferably caused to load the computer program written onto a recording medium such as a memory card or a CD-ROM, and to execute the computer program. Alternatively, a computer is preferably caused to download a computer program via a network and to execute the computer program.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A pull printing system comprising:
a server machine; and
an image forming apparatus,
wherein
the image forming apparatus includes
a request portion that requests, from the server machine, access information used for reading out a print job, and
a reception portion that receives the access information from the server machine, and
the server machine includes
a print job storage portion that receives the print job and stores the print job into a job storage area,
a device-specified storage area into which the print job is to be stored, the device-specified storage area being provided to correspond to the image forming apparatus,
a storage portion that stores, therein, access information used for reading out the print job from the device-specified storage area, and
a response portion that, if a request by the request portion is received from the image forming apparatus, and if there is access information used for reading out the print job from the job storage area, sends the access information to the image forming apparatus, and, if the request by the request portion is received from the image forming apparatus, and if there is no said access information, moves the print job to the device-specified storage area, and sends, to the image forming apparatus, the access information used for reading out the print job from the device-specified storage area.

2. The pull printing system according to claim 1, wherein
the print job includes user identification information,
if there is the job storage area corresponding to the user identification information included in the received print job, then the print job storage portion stores the received print job into the job storage area, and
if there is no said job storage area, then the print job storage portion creates a job storage area corresponding to the user identification information, and stores the received print job into the created job storage area.

3. The pull printing system according to claim 2, further comprising an access information generation portion that generates the access information used for reading out the print job from the job storage area corresponding to each piece of the user identification information during a period of time when an amount of print jobs to be received is expected to be smaller than a predetermined number.

4. The pull printing system according to claim 1, wherein
the access information is configured to be also used for deleting the print job,
the image forming apparatus includes
an acquisition portion that uses the access information received by the reception portion to acquire the print job from the server machine, and
a completion notification portion that, if a process using the obtained print job is finished, uses the access information to delete the print job stored in the server machine and to inform the server machine that the process is finished, and
if the server machine is informed by the completion notification portion of the image forming apparatus, and if the access information used for reading out the print job from the device-specified storage area corresponding to said image forming apparatus is sent to said image forming apparatus, the server machine moves, to the job storage area, a print job that is left and stored in said device-specific storage area corresponding to said image forming apparatus.

5. A server machine for a pull printing system including the server machine and an image forming apparatus, the server machine comprising:
a print job storage portion that receives a print job and stores the print job into a job storage area;
a device-specific storage area into which the print job is to be stored, the device-specific storage area being provided to correspond to the image forming apparatus;
a storage portion that stores, therein, access information used for reading out the print job from the device-specific storage area; and
a response portion that, if a request for access information used for reading out the print job is received from the image forming apparatus, and if there is access information used for reading out the print job from the job storage area, sends the access information to the image forming apparatus, and, if the request for the access information is received from the image forming apparatus, and if there is no said access information, moves the print job to the device-specific storage area, and sends, to the image forming apparatus, the access information used for reading out the print job from the device-specific storage area corresponding to the image forming apparatus.

6. The server machine according to claim 5, wherein
the print job includes user identification information,
if there is the job storage area corresponding to the user identification information included in the received print job, then the print job storage portion stores the received print job into the job storage area, and
if there is no said job storage area, then the print job storage portion creates a job storage area corresponding to the user identification information, and stores the received print job into the created job storage area.

7. The server machine according to claim 6, further comprising an access information generation portion that generates the access information used for reading out the print job from the job storage area corresponding to each piece of the user identification information during a period of time when an amount of print jobs to be received is expected to be smaller than a predetermined number.

8. The server machine according to claim 5, wherein if the image forming apparatus informs the server machine that a process using the print job is finished, and if the access information used for reading out the print job from the device-specific storage area corresponding to the image forming apparatus is sent to the image forming apparatus, the server machine deletes the print job from the device-specific storage area corresponding to the image forming apparatus, and moves, to the job storage area, a print job that is left and stored in said device-specific storage area.

9. A print job management method used in a server machine of a pull printing system including an image forming apparatus and the sever machine, the server machine including a device-specific storage area into which the print job is to be stored, the device-specific storage area being provided to correspond to the image forming apparatus, and a storage portion that stores, therein, access information used for reading out the print job from the device-specific storage area, the method comprising:

performing a print job storage process for receiving the print job and storing the print job into a job storage area; and performing a response process for, if a request for access information used for reading out the print job is received from the image forming apparatus, and if there is access information used for reading out the print job from the job storage area, sending the access information to the image forming apparatus, and, if the request for the access information is received from the image forming apparatus, and if there is no said access information, moving the print job to the device-specific storage area, and sending, to the image forming apparatus, the access information used for reading out the print job from the device-specific storage area.

10. The method according to claim 9, wherein the print job includes user identification information, and in the response process, if there is the job storage area corresponding to the user identification information included in the received print job, the server machine stores the received print job into the job storage area, and, if there is no said job storage area, the server machine creates a job storage area corresponding to the user identification information, and stores the received print job into the created job storage area.

11. The method according to claim 10, wherein the server machine is further caused to perform an access information generation process for generating the access information used for reading out the print job from the job storage area corresponding to each piece of the user identification information during a period of time when an amount of print jobs to be received is expected to be smaller than a predetermined number.

12. The method according to claim 9, wherein the access information is configured to be also used for deleting the print job, the image forming apparatus performs an acquisition process for using the access information received by the reception portion to acquire the print job from the server machine, and a completion notification process for, if a process using the obtained print job is finished, using the access information to delete the print job stored in the server machine and to inform the server machine that the process is finished, and if the image forming apparatus informs the server machine that a process using the print job is finished, and if the access information used for reading out the print job from the device-specified storage area corresponding to the image forming apparatus is sent to said image forming apparatus, then the server machine deletes the print job from the device-specified storage area corresponding to said image forming apparatus, and moves, to the job storage area, a print job that is left and stored in said device-specified storage area.

13. A non-transitory computer-readable storage medium storing thereon a computer program used for controlling a server machine of a pull printing system including an image forming apparatus and the server machine, the server machine including a device-specified storage area into which a print job is to be stored, the device-specified storage area being provided to correspond to the image forming apparatus, and a storage portion that stores, therein, access information used for reading out the print job from the device-specified storage area, the computer program causing the server machine to perform:

a print job storage process for receiving the print job and storing the print job into a job storage area; and a response process for, if a request for access information used for reading out the print job is received from the image forming apparatus, and if there is access information used for reading out the print job from the job storage area, sending the access information to the image forming apparatus, and, if the request for the access information is received from the image forming apparatus, and if there is no said access information, moving the print job to the device-specified storage area, and sending, to the image forming apparatus, the access information used for reading out the print job from the device-specified storage area.

14. The non-transitory computer-readable storage medium according to claim 13, wherein the print job includes user identification information, and in the response process, if there is the job storage area corresponding to the user identification information included in the received print job, the server machine is caused to store the received print job into the job storage area, and, if there is no said job storage area, the server machine is caused to create a job storage area corresponding to the user identification information, and store the received print job into the created job storage area.

15. The non-transitory computer-readable storage medium according to claim 14, wherein the computer program causes the server machine to further perform an access information generation process for generating the access information used for reading out the print job from the job storage area corresponding to each piece of the user identification information during a period of time when an amount of print jobs to be received is expected to be smaller than a predetermined number.

16. The non-transitory computer-readable storage medium according to claim 15, wherein the computer program causes the server machine to further perform, if the image forming apparatus informs the server machine that a process using the print job is finished, and if the access information used for reading out the print job from the device-specified storage area corresponding to the image forming apparatus is sent to the image forming apparatus, deleting the print job from the device-specified storage area corresponding to the image forming apparatus, and moving, to the job storage area, a print job that is left and stored in said device-specified storage area.

* * * * *